United States Patent
Versteijnen

[19]

[11] Patent Number: 6,131,398
[45] Date of Patent: Oct. 17, 2000

[54] APPARATUS AND METHOD FOR COOLING A PRODUCT

[75] Inventor: Carolus Marinus Bernard Versteijnen, Haren, Netherlands

[73] Assignee: Alfa Laval Agri AB, Tumba, Sweden

[21] Appl. No.: 09/068,291

[22] PCT Filed: Nov. 7, 1995

[86] PCT No.: PCT/EP95/04402

§ 371 Date: Jun. 7, 1999

§ 102(e) Date: Jun. 7, 1999

[87] PCT Pub. No.: WO97/16962

PCT Pub. Date: May 15, 1997

[51] Int. Cl.[7] .................................................. F25B 47/00
[52] U.S. Cl. ............................................. 62/99; 62/435
[58] Field of Search ................................ 62/99, 434, 435

[56] References Cited

U.S. PATENT DOCUMENTS

| | | | |
|---|---|---|---|
| 2,228,834 | 1/1941 | Kramer, Jr. | 62/200 |
| 2,403,818 | 7/1946 | McGrath | 62/200 |
| 3,156,101 | 11/1964 | McGuffey | 62/434 |
| 3,216,215 | 11/1965 | Schuett | 62/435 |
| 4,242,881 | 1/1981 | Williams | 62/225 |
| 4,476,690 | 10/1984 | Iannelli | 62/198 |
| 4,907,417 | 3/1990 | Forsythe | 62/199 |
| 5,381,670 | 1/1995 | Tippmann et al. | 62/434 |
| 5,491,982 | 2/1996 | Gowens | 62/434 |
| 5,823,010 | 10/1998 | Chao | 62/434 |

Primary Examiner—William E. Tapolcai
Attorney, Agent, or Firm—Hovey, Williams, Timmons & Collins

[57] ABSTRACT

An apparatus for cooling a product comprises a first evaporator and a second evaporator separate from the first evaporator, a first heat exchanger incorporating the first evaporator and a second heat exchanger incorporating the second evaporator. In operation, the product or an intermediate heat transfer medium is cooled in at least two first stages. During the first stage, heat is withdrawn from the product or the medium by the first evaporator cooling the product or the medium to an intermediate temperature. During the second stage, heat is withdrawn from the product or the medium by the second evaporator further cooling the product or the medium to the desired temperature. Since the product or the medium is partially cooled by an evaporator operating at a higher evaporating temperature than required for achieving the desired temperature, an improved energy efficiency is achieved.

12 Claims, 2 Drawing Sheets

APPARATUS AND METHOD FOR COOLING A PRODUCT

BACKGROUND OF THE INVENTION

1. Field of the Invention

The invention relates to an apparatus for cooling a product, including a condenser structure, an evaporator structure having at least a first evaporator section and a second evaporator section, a refrigerating circuit interconnecting the condenser structure with the evaporator structure, compressor means arranged in the refrigerating circuit between the evaporator structure and the condenser structure for pumping a refrigerant from the evaporator structure to the condenser structure, a heat exchanger structure incorporating the evaporator structure for promoting heat transfer from a product to be cooled to the evaporator structure; the heat exchanger structure including a first heat exchanger section incorporating the first evaporator section and a second heat exchanger section incorporating the second evaporator section, and means for leading the product to be cooled or an intermediate heat transfer medium from the first heat exchanger section to the second heat exchanger section.

2. Background Art

The invention also relates to a method of cooling a product, in which a product is led through a heat exchanger structure, wherein heat is withdrawn from the product by an evaporator structure and transferred from the evaporator structure to a condenser structure into which a refrigerant is compressed, the product or an intermediate heat transfer medium is cooled in at least a first stage and a subsequent second stage, heat being withdrawn from the product or the intermediate heat transfer medium during the first stage by a first evaporator section cooling the product or the intermediate heat transfer medium to an intermediate temperature and heat being withdrawn from the product or the intermediate heat transfer medium during the second stage by a second evaporator section cooling the product or the intermediate heat transfer medium from the intermediate temperature to the desired temperature.

Such an apparatus and such a method are disclosed in U.S. Pat. No. 4,907,417 and are generally referred to as apparatuses and methods for instant cooling of a product. In such apparatuses and methods the product is immediately cooled as it is passed by the heat exchanger. However, the energy consumption of such an apparatus is substantial.

In German patent specification 23 35 899 a method and an apparatus for cooling freshly obtained milk is disclosed, wherein a refrigerating apparatus with a smaller capacity can be used. To achieve this, the milk is first cooled by the refrigerating apparatus to a temperature of 15° C., subsequently transferred into a milk storage tank and finally recirculated from the milk storage tank to the same refrigerating apparatus to be cooled further to the storage temperature of 4° C. A disadvantage of this method is that the product is not immediately cooled to the desired temperature. This is particularly disadvantageous if the freshly milked milk is added to cooled milk already present in the milk storage tank, because the temperature of milk in the tank rises each time fresh, partially cooled milk is added to the tank.

SUMMARY OF THE INVENTION

It is an object of the invention is to provide an apparatus and a method for cooling a product, which are more energy efficient than the apparatuses and methods described hereinbefore.

According to the invention, this object can be achieved by providing an apparatus of the type described in the opening paragraph in which the first evaporator section and the second evaporator section are separate in that each communicates separately with the compressor means.

According to another aspect of the invention, this object can be achieved by making use of a method of the type described in the paragraph succeeding the opening paragraph in the following manner in which the second evaporator section operates separately from the first evaporator section and at a different pressure than the first evaporator section and in that refrigerant from the first evaporator section is recompressed from a different pressure than refrigerant from he second evaporator section.

The invention is based on the insight that, because the specific efficiency ot a refrigerating system is higher if the operating temperature of the evaporator is higher, a higher overall energy efficiency can be achieved if at least the first evaporator operates at a different operating pressure than another evaporator operating at a temperature sufficiently low to cool the product which has been pre-cooled in the first evaporator to the desired temperature.

Although the product is preferably cooled directly to the desired temperature, the invention can also be employed in a system and a method in which the product is first pre-cooled to a desired temporary temperature in a once-through process and then cooled to a desired definitive temperature by recirculating the product. According to the invention, the cooling efficiency can be increased in such an apparatus and in such a method by using two or more evaporators operating at different temperatures in one of the cooling phases or preferably both cooling phases.

Further objects and particular modes of carrying out the invention appear from the following description, the drawings and the claims.

DESCRIPTION OF THE PREFERRED EMBODIMENTS

Figure 1:
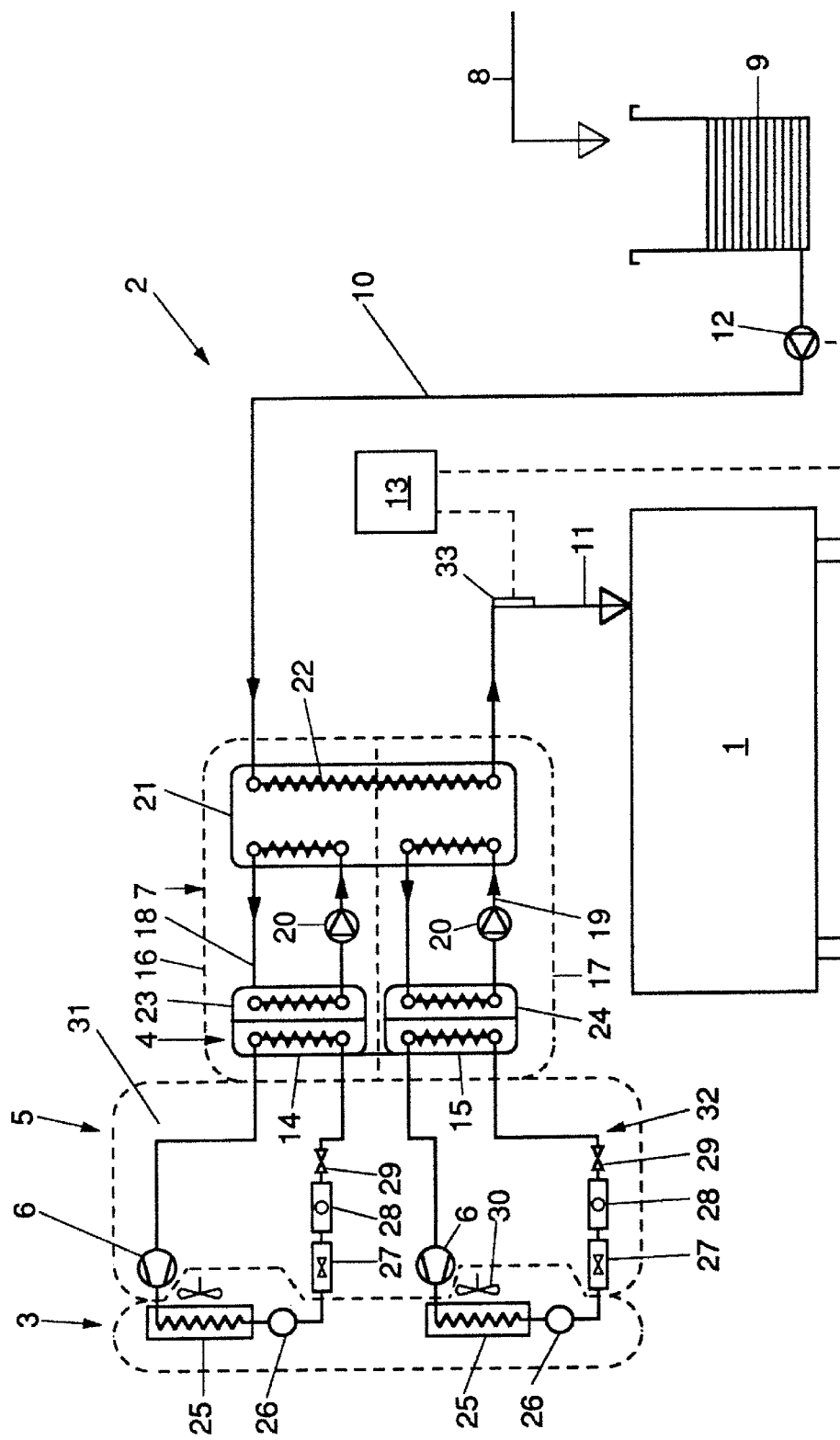
FIG. 1 is a schematic representation of a milk storage facility including a refrigerating apparatus according to a first embodiment of the invention.

The invention is first described with reference to the exemplary embodiment of an apparatus according to the invention incorporated in the milk storage facility shown in FIG. 1. Corresponding components of the milk storage facility shown in FIG. 2 are designated with the same reference numerals as in FIG. 1.

Figure 2:
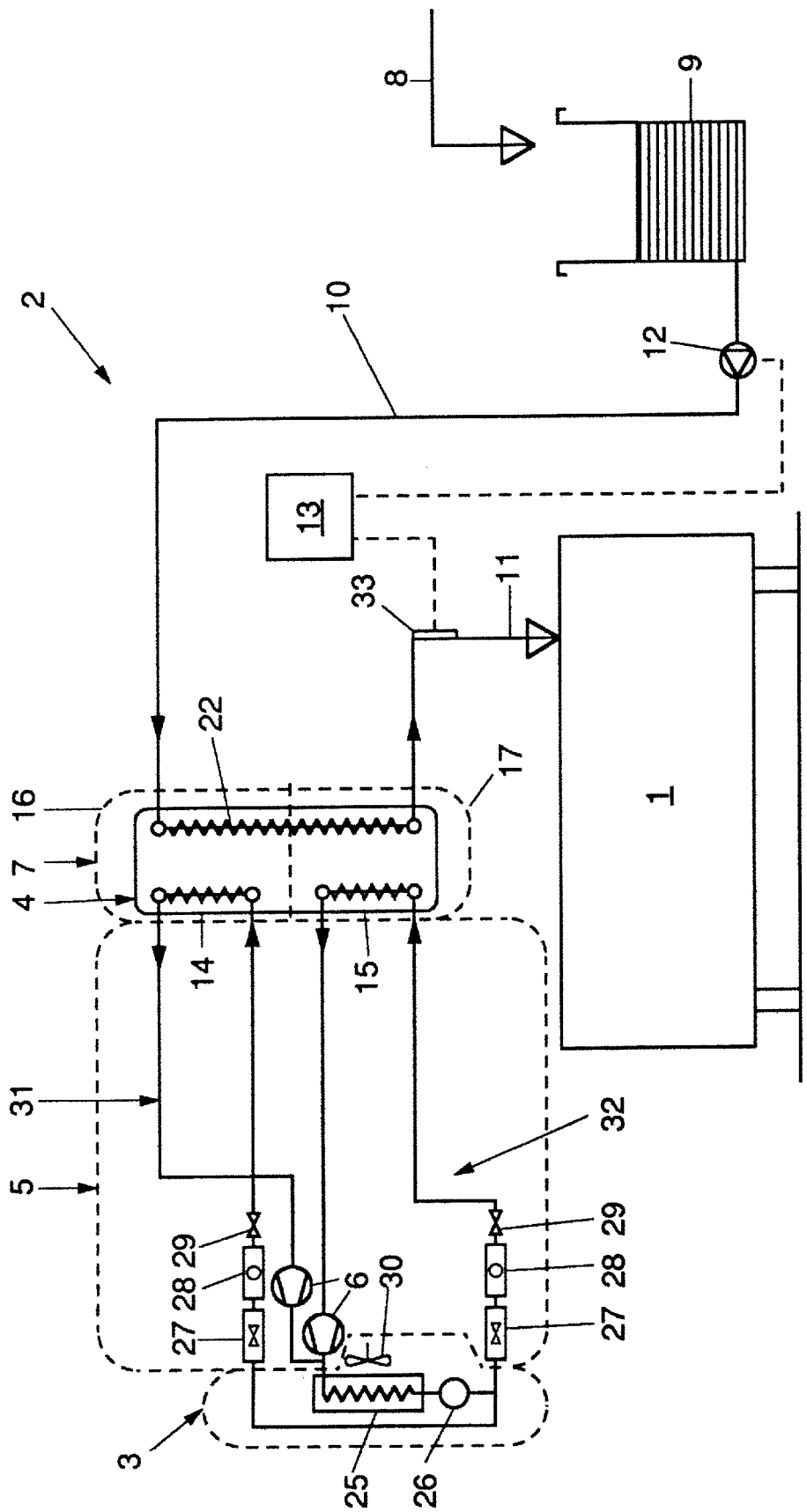
FIG. 2 is a schematic representation of a milk storage facility including a refrigerating apparatus according to a second embodiment of the invention.

The milk storage facility shown in FIG. 1 is composed of a thermally insulated milk storage tank 1 and an apparatus 2 for refrigerating freshly milked milk from a temperature of about 35° C. to a storage temperature of about 4° C.

The cooling apparatus is essentially composed of a condenser structure 3, an evaporator structure 4, a refrigerating circuit 5 interconnecting the condenser structure 3 with the evaporator structure 4. compressors 6 arranged in the refrigerating circuits 5 between the respective evaporator structure 4 and the respective condenser structure 3 for pumping a refrigerant from the evaporator structure 4 to the condenser structure 3, and a heat exchanger structure 7 for promoting heat transfer from a milk to be cooled to the evaporator structure 4.

The cooling apparatus 2 further includes a milk supply conduit 8 to be connected to a milking system, a buffer reservoir 9 into which the milk supply conduit 8 opens, a first milk transfer conduit 10 leading from the buffer reservoir 9 to the heat exchanger structure 7, and a second milk transfer conduit 11 leading from the heat exchanger structure 7 to the milk storage tank 1. A pump 12 is arranged in the first milk transfer conduit 10 for pumping milk from the buffer reservoir 9, via the heat exchanger structure 7 and the second milk transfer conduit 11 to the milk storage tank 1. A control unit 13 is connected to the pump 12 for controlling the pump 12.

The skilled person will appreciate that conventional connections between sensors in the buffer reservoir 9 and the control unit 13 can be provided to automatically start the pump 12 if milk is supplied to the buffer reservoir 9. A temperature sensor 33 connected to the control unit 13 is arranged in the second milk transfer conduit 11 downstream of the heat exchanger structure 7. The temperature of the milk is controlled by controlling the pump such that the flow rate of the milk through the heat exchanger structure 7 is increased if the temperature at the sensor 33 is too low and decreased if the temperature at the sensor 33 is too high.

The evaporator structure 4 includes a first evaporator section 14 and a second evaporator section 15 separate from the first evaporator section 14. The heat exchanger structure 7 includes a first heat exchanger section 16 for promoting heat transfer to the first evaporator section 14 incorporated therein and a second heat exchanger section 17 for promoting heat transfer to the second evaporator section 15 incorporated therein. The first and second milk transfer conduits 10, 11 are connected to a conduit passing through the heat exchanger structure 7 in such a manner that, in operation, the milk to be cooled is pumped from the first heat exchanger section 16 to the second heat exchanger section 17 by the pump 12.

The heat exchanger structure 7 further includes two separate recirculating circuits 18, 19, one in each of the sections 16, 17 of the heat exchanger structure 7. The recirculating circuits 18, 19 each communicate with a heat exchanger 21 comprising a conduit 22 for the milk to be cooled, with a heat exchanger 23 incorporating the first evaporator section 14 and with a heat exchanger 24 incorporating the second evaporator section 15. A pump 20 is arranged in each of the recirculating circuits 18, 19 to circulate an intermediate heat transfer medium between the heat exchanger 21 and the heat exchangers 23 and 24 respectively. The intermediate heat transfer medium is preferably an aqueous liquid.

The condenser structure 3 is provided with condensers 25 and, in series with the condensers 25, receiving reservoirs 26 for receiving condensed refrigerant, filter/dryers 27, inspection glasses 28 and expansion valves 29. Furthermore, fans 30 for generating an airflow along the condensers 25 are provided.

In operation, the milk to be cooled is led through the eat exchanger structure 7. Heat is withdrawn indirectly from the milk by the evaporator structure 4 via the intermediate eat transfer medium circulating in the recirculating circuits 18, 19 and transferred from the evaporator structure 4 to the condenser structure 3.

The milk is cooled in a first stage and a subsequent second stage. During the first stage, heat is withdrawn from the milk in the first heat exchanger section 16 by the first evaporator section 14 cooling the milk to an intermediate temperature. As the milk is conveyed to the second heat exchanger zone 17, it is subjected to a second cooling stage, during which the milk is cooled to the desired storage temperature by the second evaporator section 15.

The efficiency improvement obtained with the apparatus and the method according to the present invention is illustrated by the following example in which the milk is led through an Alfa Laval P30-EC80 milk heat exchanger, and Alfa Laval HAL2-S9-QR85 K1 refrigerating units with Alfa Laval CB50-60 intermediate heat exchangers are used. It has been found that at a condensation temperature of 50° C. and an ambient temperature of 32° C., the efficiency of the refrigerating process is 3.4 (i.e. input of 1 watt results in a thermal energy flow of 3.4 watts extracted from the product to be cooled) at an evaporating temperature of 10.5° C. At an evaporating temperature of 0.5° C., the efficiency is 2.5. The main cause for this difference in efficiency appears to be that the efficiency of the compressors is increased if the pressure difference over the compressor is lowered.

If milk is cooled by using an evaporating unit operating at a given efficiency, the energy consumption expressed in Wh for cooling 1 liter of milk to the desired temperature would be: $\Delta T \times 1.16 \times 1/r$, where $\Delta T$ is the temperature difference, 1.16 is the amount of energy required for cooling 1 liter of milk by 1° C. and r is the efficiency of the process.

Thus, at an evaporating temperature of 0.5° C., where the efficiency is 2.5, the energy consumption would be $(35-4) \times 1.16 \times 1/2.5 = 14.4$ Wh/l.

If the milk is first cooled to a temperature of 15° C. at an evaporating temperature of 10.5° C., where the efficiency is 3.4, the energy consumption of the first cooling stage would be $(35-15) \times 1.16 \times 1/3.4 = 6.8$ Wh/l. If the milk is subsequently cooled further to the storage temperature of 4° C. at an evaporating temperature of 0.5° C., where the efficiency is 2.5, the energy consumption of the second cooling stage would be $(15-4) \times 1.16 \times 1/2.5 = 5.1$ Wh/l. The total energy consumption of the process according to the invention is thus 11.9 Wh/l instead of 14.4 Wh/l, which is a reduction of 17.4%.

Since in the apparatus according to the invention the first evaporator section 14 is operative upstream of the second, separate evaporator section 15, and the temperature of the evaporator is determined mainly by the temperature of the product or the intermediate transfer medium from which heat is extracted, a higher, more efficient evaporating temperature is obtained in the first separate evaporator section 14 than in the second evaporator section. Thus, a part of the cooling process is carried out at a higher efficiency than in a process in which a single evaporator section or more evaporator sections operating at the same evaporating temperature are used.

Preferably, the second evaporator section 15 operates at a lower pressure than the first evaporator section 14 in order to adapt the pressure in the evaporators to the evaporating temperatures at which the evaporators operate. However, if substantially different refrigerants are used in the evaporators, it is preferred to use correspondingly different operating pressures in the evaporators.

Different operating pressures in the first evaporating section 14 and the second evaporating section 15 can be set and maintained in a simple manner, because two separate refrigerating circuit sections 31, 32 are provided. The first refrigerating circuit section 31 interconnects the condenser structure 3 with the first evaporator section 14 and a second refrigerating circuit section 32 interconnects the condenser structure 3 with the second evaporator section 15. Furthermore, separate expansion valves 29 are arranged in each refrigerating circuit section 31, 32. In operation, the first expansion valve 29 in the first refrigerating section 31 controls the flow of refrigerant from the condenser structure 3 to the first evaporator section 14 and the second expansion valve 29 in the second refrigerating section 32 controls the flow of refrigerant from the condenser structure 3 to the second evaporator section 15.

Different refrigerants can be used in the first refrigerating circuit section 31 and the second refrigerating circuit section 32 and therefore also in the first evaporator section 14 and the second evaporator section 15, because the condenser structure 3 comprises two separate condensers 25 and each condenser 25 communicates with one of the separate refrigerating circuit sections 31, 32.

In the apparatus according to FIG. 1, the heat exchanger structure 7 comprises a first recirculating circuit 18 and a second recirculating circuit 19 separate from the first recirculating circuit 18. Each of the recirculating circuits 18, 19 communicates with a heat exchanger 21 comprising a conduit 22 for the product to be cooled. The first recirculating circuit communicates with a heat exchanger 23 incorporating the first evaporator section 14 and the second recirculating circuit 19 communicates with a heat exchanger 24 incorporating the second evaporator section 15. This allows the evaporator sections 14, 15 to operate at widely different operating temperatures, because the temperature of intermediate heat transfer medium leaving the heat exchanger 23 incorporating the first evaporator section 14 can be higher than the temperature of the intermediate heat transfer medium entering the heat exchanger 24 incorporating the second evaporator section 15. This in turn allows the first evaporator section to operate at a higher evaporating temperature and, hence, at a higher degree of efficiency.

If the product to be cooled or an intermediate heat transfer medium is directly transferred from a first heat exchanger incorporating the first evaporator section to a second heat exchanger incorporating the second evaporator section 15, the exit temperature of the first heat exchanger is in principle the same as the entry temperature of the second heat exchanger. However, for reasons of constructional simplicity, it can be advantageous to provide a single recirculating circuit for an intermediate heat transfer medium co-operating with both a first and a second evaporator section, such that the intermediate heat transfer medium is passed from the first evaporator section to the second evaporator section. A general advantage of the use of an intermediate heat transfer medium is that the risk of contamination of the milk with refrigerant in case a leak in the refrigerating system occurs is substantially reduced.

In the refrigerating apparatus of the milk storage facility shown in FIG. 2. The evaporator sections 14, 15 are arranged directly adjacent conduits 22 for guiding the product to be cooled. The temperature of the milk leaving the first heat exchanger section 16 is in principle the same as the temperature of the milk entering the second heat exchanger section 17, so the difference in evaporating temperature between the first evaporator section 14 and the second evaporator section 15 is limited by the cooling trajectory obtained in the second evaporator section 15. Nevertheless, direct withdrawal of heat from the milk provides the advantage that the difference between the evaporating temperature in each evaporator section 14, 15 and the temperature of the milk leaving the respective heat exchanger section 16, 17 is in principle smaller than if an intermediate heat transfer medium is used. This in turn provides the advantage that the evaporator section 14, 15 can operate at higher evaporating temperatures and thus with a higher efficiency.

The refrigerating apparatus shown in FIG. 2 is simplified in comparison with the refrigerating apparatus shown in FIG. 1 in that the condenser structure 3 comprises a single condenser 25 interconnected with both the first evaporator section 14 and the second evaporator section 15. Although the refrigerating apparatus is provided with a single condenser 25, the pressures in the first evaporator section 14 and the second evaporator section 15 can be controlled independently of each other, because in each refrigerating circuit section 31, 32 an expansion valve 29 is arranged.

The invention is not limited to the embodiments described hereinbefore, but many variations and other embodiments will be apparent to the skilled person in view of the present teaching. It is for example also possible to use three or more evaporator sections operating at different evaporating temperatures. Another possibility is to provide the evaporator sections in the form of separate evaporators incorporated in separate heat exchangers. Furthermore, the invention can also be employed in a system the refrigerating capacity of which is too small to achieve instant cooling. In that case, two evaporators operating at different cooling temperatures can be used during both the feeding of fresh milk and the cooling thereof to a desired intermediate temperature and the recirculation of milk from the storage tank to cool the milk further to the desired storage temperature. An apparatus and a method according to the invention can be used not only for cooling milk, but also for cooling any product, whether gaseous, liquid, in bulk or in distinct pieces, which has to be cooled in a temperature range in which a condenser/evaporator refrigerating system can be used advantageously.

What is claimed is:

1. An apparatus for cooling a product, comprising:
   a condenser structure;
   an evaporator structure comprising at least a first-evaporator section and a second evaporator section;
   a refrigerating circuit interconnecting the condenser structure with the evaporator structure;
   compressor means arranged in the refrigerating circuit between the evaporator structure and the condenser structure for pumping a refrigerant from the evaporator structure to the condenser structure;
   a heat exchanger structure incorporating the evaporator structure for promoting heat transfer from a product to be cooled to the evaporator structure; said heat exchanger structure comprising a first heat exchanger section incorporating the first evaporator section and a second heat exchanger section incorporating the second evaporator section; and
   means for leading the product to be cooled or an intermediate heat transfer medium from the first heat exchanger section to the second heat exchanger section;
   wherein said first evaporator section and said second evaporator section are separate in that each communicates separately with said compressor means.

2. An apparatus according to claim 1, wherein the refrigerating circuit comprises a first refrigerating circuit section interconnecting the condenser structure with the first evaporator section and a second refrigerating circuit section interconnecting the condenser structure with the second evaporator section, said second refrigerating circuit section being separate from the first refrigerating circuit section.

3. An apparatus according to claim 2, wherein at least a first and a second expansion valve are arranged in the refrigerating circuit, the first expansion valve being arranged in the first refrigerating circuit section for controlling the flow of refrigerant from the condenser structure to the first evaporator section and the second expansion valve being arranged in the second refrigerating circuit section for controlling the flow of refrigerant from the condenser structure to the second evaporator section.

4. An apparatus according to claim 3, wherein the condenser structure comprises two separate condensers, communicating with the two refrigerating circuit sections, respectively.

5. An apparatus according to claim 1, wherein the condenser structure comprises a single condenser interconnected with both the first evaporator section and the second evaporator section.

6. An apparatus according to claim 5, wherein at least two refrigerating circuits are connected to a common condenser.

7. An apparatus according to claim 1, wherein the heat exchanger structure comprises at least one recirculating circuit structure communicating with a heat exchanger comprising a conduit for the product to be cooled, with a heat exchanger incorporating the first evaporator section and with a heat exchanger incorporating the second evaporator section.

8. An apparatus according to claim 1, wherein the recirculating circuit structure comprises at least a first recirculating circuit and a second recirculating circuit separate from said first recirculating circuit, each of said recirculating circuits communicating with the heat exchanger comprising a conduit for the product to be cooled, the first recirculating circuit communicating with a heat exchanger incorporating the first evaporator section and the second recirculating circuit communicating with a heat exchanger incorporating the second evaporator section.

9. An apparatus according to claim 1, wherein the evaporator sections are arranged directly adjacent at least one conduit for guiding the product to be cooled.

10. A method of cooling a product, in which a product is led through a heat exchanger structure, wherein heat is withdrawn from the product by an evaporator structure and transferred from the evaporator structure to a condenser structure into which a refrigerant is compressed, the product or an intermediate heat transfer medium is cooled in at least a first stage and a subsequent second stage, heat being withdrawn from the product or the intermediate heat transfer medium during the first stage by a first evaporator section cooling the product or the intermediate heat transfer medium to an intermediate temperature and heat being withdrawn from the product or the intermediate heat transfer medium during the second stage by a second evaporator section separate from the first evaporator section cooling the product or the intermediate heat transfer medium from the intermediate temperature to the desired temperature, wherein the second evaporator section operates separately from the first evaporator section and at a different pressure than the first evaporator section and in that refrigerant from the first evaporator section is recompressed from a different pressure than refrigerant from the second evaporator section.

11. A method according to claim 10, wherein the product or the intermediate heat transfer medium is cooled in a first section of the heat exchanger structure during said first stage, the product is subsequently transferred to a second section of the heat exchanger structure and cooled in said second section during said second stage.

12. A method according to claim 10, wherein the second evaporator section operates at a lower pressure than the first evaporator section.

* * * * *